United States Patent Office 2,936,264
Patented May 10, 1960

2,936,264

OXYGENATION OF STEROIDS BY RHODOSEPTORIA

Donald A. Kita, Jackson Heights, N.Y., assignor to Chas. Pfizer & Co., Inc., New York, N.Y., a corporation of Delaware No Drawing. Application July 16, 1954
Serial No. 443,953

9 Claims. (Cl. 195—51)

This invention is concerned with a method for the oxygenation of certain steroid compounds by means of selected cultures of microorganisms. In particular, it is concerned with the introduction of an hydroxyl group at the 11-position of the steroid nucleus in the $\beta$-configuration. A particularly useful reaction which may be accomplished with the present process is the conversion of compound S (Reichstein's Substance S or 17-hydroxy-11-desoxycorticosterone) to compound F (Kendall's Compound or 17-hydroxycorticosterone).

The preparation of biologically active steroid compounds, such as cortisone and compound F, is fraught with many great difficulties. One of the most difficult problems is the introduction of oxygen atoms at essential positions in the steroid nucleus particularly at the 11-position of this nucleus. Compound S is available by known synthetic routes from various naturally occurring, relatively cheap, steroid starting materials, such as the vegetable-type steroid compounds. Compound F, on the other hand, is considerably more difficult to obtain and is a very valuable compound, particularly useful in the treatment of rheumatoid arthritis and certain other conditions of the human body. Any process whereby compound S may be converted to compound F in good yield and without undue expense is of tremendous value to the pharmaceutical industry and to the public in general.

Methods have previously been reported for converting compound S to compound F by means of organisms entirely different from those described below for use in the present process. In U.S. Patent 2,602,769 there is described the use of *Cunninghamella blakesleena* (of the order Mucorales) and in a publication appearing in the Journal of the American Chemical Society (vol. 74, p. 2381 (1952)) a process utilizing *Streptomyces fradiae* is described. In U.S. Patent 2,658,023 there is described the use of the genus Curvularia, which genus belongs to the order Moniliales.

Literally thousands of other organisms have been tested and have been shown to be useless for converting compound S to compound F. It has now unexpectedly been discovered that the reaction may successfully be carried out by the use of organisms from the genus Rhodoseptoria, which genus belongs to the order Sphaeropsidales. Microorganisms of this genus have shown very good results in the process of introducing an 11$\beta$ hydroxyl group in compound S and other steroid molecules having a methylene group at the 11-position. The reactions have been carried out in good yield, and the products may readily be purified. Furthermore, the organism is extremely simple to grow, and may readily be used in large scale commercial operations. The ease with which the organism readily grows on very cheap media is of particular advantage here.

It has been found that by contacting a steroid compound, in particular those having a methylene group at the 11-position, with the oxygenating activity of microorganisms of the genus Rhodoseptoria, i.e. with the organisms themselves or with enzyme systems of the organisms, the selective 11-$\beta$-hydroxylation of these steroid compounds may be accomplished. Among other reactions which may be accomplished is the conversion of compound S to compound F. One organism employed was obtained from the Quartermaster Corps. It was identified by them as a species of the genus Rhodoseptoria (QM 704). A living culture of this organism has been deposited with the American Type Culture Collection in Washington, D.C., where it has been given the number ATCC 11833.

As indicated above, the process of the present invention may be used for the conversion of compound S to compound F. However, the process may also be used for the 11-$\beta$-oxygenation of a variety of other steroid compounds which are unsubstituted in the 11-position of the nucleus. Various side chains may be present at the 17-position of the nucleus, e.g. that in compound S or the esters or ethers thereof, COOH, alkyl or alkylene groups, or a keto group. In the 3-position hydroxyl groups or esters or ethers thereof may be present. The steroid compounds used as substrates for the reaction may also bear carbon to carbon double bonds at various points of the nucleus, such as the 3,4- or 5,6- position. It should be realized that yield of oxygenated product will vary to some extent with the nature of the steroid compound used as starting material, with the particular strain of Rhodoseptoria used, and with the conditions employed for the reaction (i.e. temperature, time, pH, nutrient medium, time at which the compound is added to the microorganism, etc.). Furthermore, a given oxygenating microorganism of the preferred genus may show variation in its effect upon various steroid compounds, that is yields will vary somewhat. Among the products which have been converted to the corresponding 11-$\beta$-hydroxylated products are compound S and desoxycorticosterone. Various methods may be used in the evaluation of the products produced by these processes. For instance, if a steroid compound with a suitable side chain is used, the proportion of the product produced may be evaluated by determination of the effect on adrenalectomized mice or upon the eosinophil count of experimental animals. Furthermore, the pure products produced by the hydroxylation reaction may be isolated as described below.

The effectiveness of a chosen microorganism for the process of this invention may be determined by cultivating the organism in a suitable nutrient medium containing carbohydrates, salts, sources of organic nitrogen, and so forth. The steroid compound as a solid or as solution in a suitable solvent, for example, acetone or ethanol, is added to the cultivated microorganism under sterile conditions and the mixture is agitated and aerated in order to bring about the growth of the microorganism and oxygenation of the steroid substrate. The steroid may be added when the medium is seeded under sterile conditions with a culture of the microorganism or after growth of the organism is established. In some cases it may be found advisable to add the steroid compound after growth of the microorganism has been established in the nutrient medium under aerobic conditions. This is particularly true if, during the initial stages of growth of the microorganism, there is a tendency to produce undesired by-products from the steroid substrate. The acetate or other ester of a steroid may be used in place of the alcohol itself, although this may sometimes lead to an appreciably lowered yield of hydroxylated product. Alternatively, enzyme preparations from the growth of a suitable oxygenating organism of the genus Rhodoseptoria may be used for conducting the process. A further, most useful method is one in which the microorganism is grown on a suitable nutrient medium under aerobic conditions in the absence of the steroid. The mycelial growth may then be filtered from the broth and may, if desired, be washed with distilled water. The mycelium is then suspended in distilled water containing the steroid substrate. Agitation of the mixture and aeration is continued for a period of from about 12 to 48 hours after which the products of the reaction are recovered. This process has the advantage of ease of recovery of the steroid compound, since the various nutrient materials originally used to obtain growth of the microorganism are now absent as well as the various materials excreted by the growing organisms during the initial period. Other methods familiar to enzyme chemists may be utilized for conducting the present oxygenating process. The proportion of products and the rate of oxygenation, as well as the nature of the by-products formed, may vary depending on the use of the whole fermentation broth or of the isolated washed mycelium.

In general a concentration of not greater than one to two percent by weight of the total weight of substrate, for instance, the compound S-type material, is used in conducting this process, although sometimes other concentrations may be found to be more favorably used. Since the solubility of the starting material in water is quite limited, an excess of the material may be slowly converted to the oxygenated product. However, the state of subdivision of the steroid when added to the oxygenating system, i.e. growing microorganism or enzyme system, does not seem greatly to affect the yield and nature of the products under otherwise identical conditions. If a water-miscible solvent solution of the steroid compound is added to the aqueous fermentation system, the steroid is generally precipitated in finely divided form in the presence of a large excess of water. This does not seem to appreciably improve the rate of reaction as compared to the addition of dry, relatively large crystals of the steroid.

After completion of the oxygenation process, the product may be recovered from the mixture by extraction with a suitable water-immiscible solvent. Chlorinated lower hydrocarbons, ketones, and alcohols are useful. These include chloroform, methylene chloride, trichlorethane, ethylene dichloride, and so forth. The use of hot ethylene dichloride, i.e. from about 40° to about 80° C., is particularly favored for the extraction of the steroid products. The extract of product and unreacted starting material may be concentrated to a small volume or to dryness to obtain a solid product. Purification of the product may be accomplished in several ways. Most useful is the separation by means of chromatography of the product from starting material and from other products such as more highly oxygenated materials that may be formed during the reaction. Adsorbents such as silica gel or other suitable adsorbents are particularly useful for this purpose. It has been found that a column prepared from a mixture of silica gel and a lower alcohol, especially ethanol, is particularly useful for the separation of the steroid starting materials. The steroid mixtures may be applied to columns of adsorbents such as silica gel in concentrated chloroform or methylene chloride solution. The column may then be washed with additional amounts of the solvent to remove such impurities as fats and pigments. The adsorbed mixture then is separated by the gradual addition of a mixture of the solvent together with a small percentage, for example 1 to 5%, of a lower alcohol (methanol, ethanol, etc.). The materials may be separated and the separated compounds gradually eluted from the column by utilization of a mixture of solvents of gradually increasing polarity; for instance, a mixture of methylene chloride and a minor, gradually increasing amount of ethanol is very useful.

Fractions of the eluted material from chromatographic columns may be checked for the nature of the product by subjecting small portions of the solutions to chromatography on paper. Methods which are particularly useful for conducting this type of separation and analysis are described in detail in U.S. Patent 2,602,769, issued on July 8, 1952, to H. C. Murray et al., and in a publication by Shull et al. in the Archives of Biochemistry, vol. 37, p. 186 (1952). This method is also very useful for evaluating new strains of microorganisms to determine their usefulness in the process of this invention. The fermentation may be conducted on a small scale with the steroid or compound S or a suitable compound S derivative as the substrate and the whole extract of the fermentation mixture may be concentrated and subjected to paper chromatography. By utilizing known samples of compound S, compound F and other related products for comparison, it is possible to determine whether the chosen microorganism is commercially practicable for the present process.

Descending paper chromatograms utilizing paper treated with a 35% solution of propylene glycol and developed with a mixture of 78 volumes of toluene and 22 volumes of dioxane may be utilized for the rapid evaluation of various strains of the preferred microorganisms. Such a separation can be completed in as little as three hours and the paper chromatogram, after being dried, may be examined under ultraviolet light in a fluorescent scanner, such as that of Haines and Drake (Federation Proceedings 1950, vol. 9, p. 180), to determine the position of the various materials, such as compounds S and F, by their fluorescence. The zones in which the various substances occur may be marked and cut from the sheet or strip of paper. The material may then be eluted with a solvent such as ethanol and obtained as practically pure solid material by evaporation. A quantitative analysis of such a mixture may be accomplished in this manner. The amount of the isolated products may be determined, for example by measuring the ultraviolet absorption of solutions of the materials. Particularly useful are the absorption characteristics of these compounds when dissolved in concentrated sulfuric acid.

After separation of the reaction products by column chromatography, the desired fractions may be combined and concentrated to a small volume. The product may then be crystallized from a suitable solvent such as ethyl acetate. Corticosterone prepared by the process of this invention has also been compared with a standard sample and shown to be identical with it.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

Example I

A culture of an organism received from the culture collection of the Quartermaster Corps at Philadelphia and designated by them as Rhodoseptoria sp. QM 704, was propagated on an agar nutrient medium. The organism was rinsed from the agar slant under sterile conditions into a sterile medium having the following composition:

|  | Percent |
|---|---|
| Malt extract | 0.5 |
| Cerelose | 3.0 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide | |

One hundred milliliters of this medium was used in each of several three hundred-milliliter flasks. To each flask was added 50 milligrams of compound S dissolved in a small volume of acetone. Throughout these operations the fermentation mixture was maintained under sterile conditions. The mixture was then shaken for a period of seven days at a temperature of about 28° C. The contents of the flasks were combined and extracted with several portions of ethylene dichloride using one-half the volume of the aqueous phase each time. The combined ethylene dichloride extracts were dried over anhydrous sodium sulfate and, after the drying agent was removed, the solvent was removed under vacuum. The solution was concentrated to 1–2 milliliters' volume and a sample of this solution was subjected to paper chromatography using a system of solvents containing propylene glycol and toluene. It was demonstrated that the product contained compound F by running paper chromatograms with a sample of authentic compound F as a control. Indications of more highly oxygenated products were also obtained.

The ethylene dichloride concentrate was placed on a chromatographic column consisting of silica gel mixed with a small volume of ethanol (one milliliter of solvent per gram of silica gel). The column was developed by means of a mixture of 97 volumes of methylene chloride and three volumes of 95% ethanol. The effluent from the column was collected in small fractions of equal volume and periodically these were examined by means of paper chromatography in order to separate the fractions containing the desired product. All of these fractions were combined and concentrated under vacuum to dryness to obtain the solid product. This was proved to be compound F by comparing with a known sample of the same material.

*Example II*

A culture of Rhodoseptoria sp. QM 704 was grown in flasks containing an aqueous medium consisting of 30 grams of soybean meal per liter and 1.43 grams of monopotassium phosphate per liter. One hundred milliliters of this inoculum was added under sterile conditions to two liters of a medium with the same composition. The inoculated medium was aerated at the rate of about one-half to one volume of air per volume of solution per minute at 27° to 28° C. for 24 hours. During this time the mixture was stirred at the rate of about 1700 revolutions per minute. One-half gram of compound S in the form of the alcohol was dissolved in 20 milliliters of 95% ethanol. The solution was added to the fermentation mixture under sterile conditions. The reaction was then continued for a further 24 hours under exactly the same conditions as described above.

The whole fermentation mixture was removed from the fermentation vessel. The mixture was extracted twice with an equal volume of ethylene dichloride at 70° C. The extracts were combined and evaporated to dryness. The dry solids were dissolved in a small volume of methylene chloride and the solution was added to a column of silica gel. The silica gel column had been prepared previously by treating each gram of silica gel with one milliliter of 95% ethanol. This mixture was suspended in methylene chloride and poured into a chromatographic column. After the steriod mixture had been introduced into the column it was washed with several portions of methylene chloride to remove fats and pigments. The column was then developed by adding a mixture of 97 volumes of methylene chloride and 3 volumes of ethanol. The eluate was divided into a series of small fractions. Portions of these were analyzed by means of the paper chromatographic system described above and those fractions containing the same compound were combined. It was found that the first material leaving the column was recovered compound S. This material is recoverable and may be reused. The second material leaving the column was an unidentified steriod. The third material leaving the column was recovered and shown to be compound F. By removing the solvent from the combined fractions containing the compound F, there was obtained a dry product which may be readily further purified.

*Example III*

A culture of Rhodoseptoria sp. QM 704 as used in Example II was cultivated on the same medium described in Example II under aerobic conditions. The mycelium from two liters of such a mixture obtained after 22 hours of growth was filtered, washed with a small volume of distilled water and then suspended in two liters of distilled water. One-half gram of compound S was added to the mixture. This preparation was stirred and aerated at the rate of one-half volume of air per volume of mixture per minute for 16 hours. The mixture was then extracted with one-half volume of chloroform three times. The combined chloroform extracts were concentrated to a small volume and the mixture of steroids was purified by column chromatography on silica gel. A good yield of pure compound F was obtained. In addition, some of the compound S used as starting material was recovered in pure form.

*Example IV*

A culture of Rhodoseptoria sp. QM 704 was grown as described in Example II above, except that desoxycorticosterone was used in place of compound S. After the conclusion of the fermentation, the crude product was extracted by means of chloroform and the solvent was then removed under vacuum. The residual product was tested for its activity in liver glycogen storage in adrenalectomized mice and the positive result showed the introduction of an 11-β-hydroxyl in the steroid. Purification by column chromatography as described above gave a compound that was shown to be corticosterone by its physical constants.

*Example V*

The procedure of Example II was repeated, except that 17α-hydroxyprogesterone was used as the starting steroid. The recovered product was identified by its physical constants as being 11β,17α-dihydroxyprogesterone.

What is claimed is:

1. A process for the 11-β-hydroxylation of a steroid compound, which comprises contacting said steroid compound with the oxidizing enzymes of an organism of the Rhodoseptoria species that is typified by Rhodoseptoria sp. (QM 704) ATCC 11833.

2. A process as claimed in claim 1 wherein the steroid compound is subjected to the action of a growing culture of the microorganism.

3. A process as claimed in claim 1 wherein the microorganism is cultivated aerobically in a nutrient medium until substantial growth is obtained, the mycelium is separated from the broth and the compound is contacted with an aqueous suspension of the mycelium.

4. A process for the 11-β-hydroxylation of a steroid compound, which comprises contacting said steroid compound with the oxidizing enzymes of the Rhodoseptoria (sp. QM 704) organism ATCC 11833.

5. A process as claimed in claim 4 wherein the steroid compound is selected from the group consisting of compound S, desoxycorticosterone, and 17α - hydroxyprogesterone.

6. A process for the conversion of compound S to compound F, which comprises contacting compound S with the oxidizing enzymes of an organism of the Rhodoseptoria species that is typified by Rhodoseptoria sp. (QM 704) ATCC 11833.

7. A process for the preparation of compound F, which comprises cultivating the Rhodoseptoria (sp. QM 704) organism ATCC 11833 in an aqueous nutrient medium under aerobic conditions in the presence of compound S.

8. A process for the preparation of corticosterone, which comprises contacting desoxycorticosterone with the oxidizing enzymes of an organism of the Rhodoseptoria species that is typified by Rhodoseptoria sp. (QM 704) ATCC 11833.

9. A process for the preparation of 11β,17α-dihydroxyprogesterone, which process comprises contacting 17α-hydroxyprogesterone with the oxidizing enzymes of an organism of the Rhodoseptoria species that is typified by Rhodoseptoria sp. (QM 704) ATCC 11833.

References Cited in the file of this patent

UNITED STATES PATENTS

| | | |
|---|---|---|
| 2,602,769 | Murray et al. | July 8, 1952 |
| 2,658,023 | Shull et al. | Nov. 3, 1953 |